Sept. 22, 1964   P. F. GOOD ET AL   3,149,402
APPARATUS FOR ASSEMBLING AND SECURING ARTICLES TO A STRIP
Filed June 12, 1962   6 Sheets-Sheet 1

INVENTORS
P. F. GOOD
R. T. HAMMEL
BY
S. Gundersen
ATTORNEY

INVENTORS
P. F. GOOD
R. T. HAMMEL
BY *S. Gundersen*
ATTORNEY

INVENTORS
P. F. GOOD
R. T. HAMMEL
BY *L. Gundersen*
ATTORNEY

United States Patent Office 3,149,402
Patented Sept. 22, 1964

3,149,402
APPARATUS FOR ASSEMBLING AND SECURING ARTICLES TO A STRIP
Paul F. Good, Lutherville, and Robert T. Hammel, Towson, Md., assignors, by direct and mesne assignments, to Western Electric Company, Incorporated, New York, N.Y., a corporation of New York
Filed June 12, 1962, Ser. No. 201,902
7 Claims. (Cl. 29—33)

This invention relates to apparatus for assembling and securing articles to a strip and particularly for assembling cylindrical bushings with a corrugated or crimped metal strip and bonding the bushings thereto.

To facilitate the manufacture of certain types of cable terminals, a plurality of terminal elements are positioned within a shell for the reception of individual conductors of a cable. The shell is filled with a suitable insulation thereby insulating the various terminal elements and the individual conductors within the shell. An example of these terminals are bushings designed to receive lightning protector units. In order that the terminal elements may be more readily inserted into the plastic shell, a method has been devised for bonding the bushings to a strip, wherein such a method is disclosed in Patent 2,779,094 to Frank A. Christoffel.

An object of the invention is to provide a new and useful apparatus for automatically assembling articles with a strip.

A further object of the invention is to provide a new and useful apparatus for automatically assembling and bonding a plurality of groups of bushings to a strip in a desired repetitive pattern.

In accordance with certain features of the invention, apparatus is provided for crimping a cooper strip and for simultaneously feeding the cooper strip, a strip of solder and a plurality of bushings to an assembling position, wherein the solder is held between the bushings and the copper strip. The assembly is then passed through a heated area wherein the solder is melted and flows about the bushings and the copper strip and is further cooled, thereby bonding the bushings to the strip.

Further, apparatus, is provided for setting a pattern to determine the number of bushings to be bonded to a given portion of the metal strip. A cutting mechanism is utilized to sever the assembly in desired lengths, thereby providing an assembly such as that disclosed in the aforementioned Christoffel patent.

These and other objects and advantages of the invention will be apparent from the following detailed description of the apparatus embodying the invention, when reading conjunction with the drawings in which:

FIG. 10 is a sectional view taken on line 10—10 of FIG. 2 showing the conveyor means for removing the bonded assemblies from the bonding area;

FIG. 11 is a sectional view taken on line 11—11 of FIG. 2 showing a cutting mechanism for severing the strip at a predetermined point to provide desired assembled units;

Figure 12:
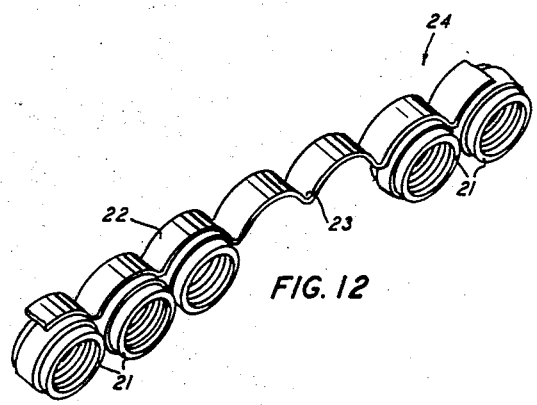
FIG. 12 is a perspective view of a portion of the bonded assemblies.

As viewed in FIG. 12, the apparatus is designed to assemble and bond a plurality of brass bushings 21 to a crimped copper strip 22 wherein the strip is severed at a crimped section 23 to provide a complete assembly, a portion of which is shown and generally designated by the reference numeral 24.

Figure 1:
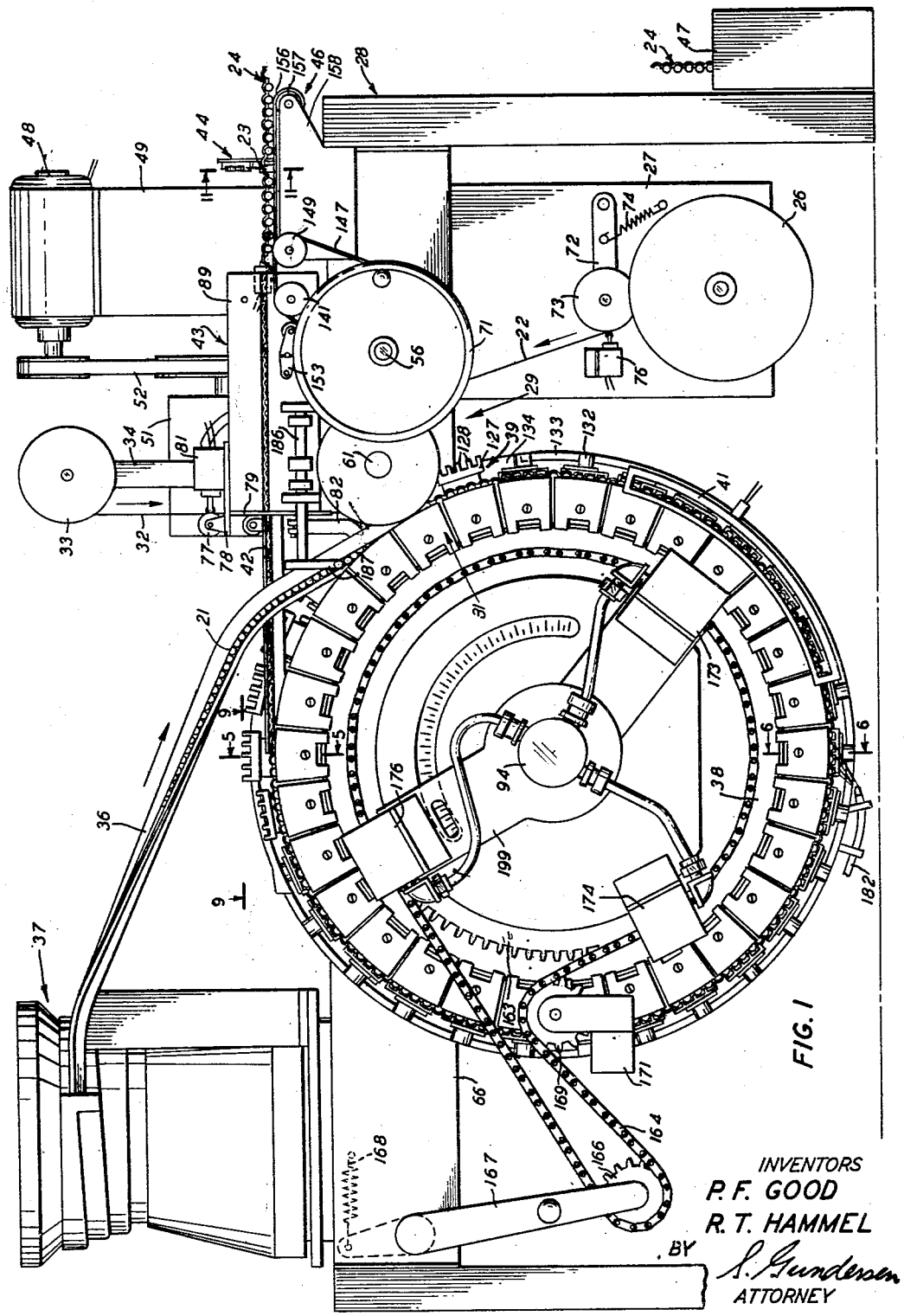
FIG. 1 is an elevational view of the apparatus embodying the invention.

Referring to FIG. 1, the copper strip 22 is fed from a supply reel 26 which is mounted on a supporting plate 27 depending from a support table 28. The strip 22 is fed to a crimping station, generally designated by the reference numeral 29, and is further fed to an assembly station, designated by the reference numeral 31. A strip of solder 32 is fed from a solder supply reel 33 to the assembly station 31 wherein the supply reel 33 is mounted on a support 34 above the table 28.

A series of bushings 21 are fed to the assembly station 31 by gravitation through a chute 36 from a vibratory hopper, designated generally by the reference numeral 37, which is positioned on the table 28. In this manner, the crimped copper strip 22 and the series of bushings 21 are assembled such that the bushings rest between the crimped portions of the strip 22 with the strip of solder 32 held therebetween. A wheel, generally designated by the reference numeral 38 and utilized as a carriage or conveyor, is provided with a series of radially arranged clamping members, designated generally by the reference numeral 39, mounted about the periphery of the wheel 38. As the copper strip 22, the solder 32 and the bushings 21 are assembled, the clamping members 39 are actuated to retained the elements in an assembled unit. The wheel 38 is rotated so that the assembled units pass through an area which is heated by an induction coil 41 thereby melting the solder which is held between the bushings 21 and the strip 22. As the assembled units rotate away from the heated area, the solder is cooled and solidifiies thereby bonding the bushings 21 to the crimped strip 22.

The bonded unit is then rotated to an outfeed trough 42, and, further, to an unloading conveyor, generally designated by the reference numeral 43. A cutting mechanism, generally designated by the reference numeral 44, is positioned adjacent to the unloading conveyor 43 for severing the strip 22 at the predetermined crimped sections 23 thereby providing the completed assemblies 24.

The assemblies 24 are then conveyed by a conveyor 46 and fall by gravitation into a receptacle 47.

Figure 15:
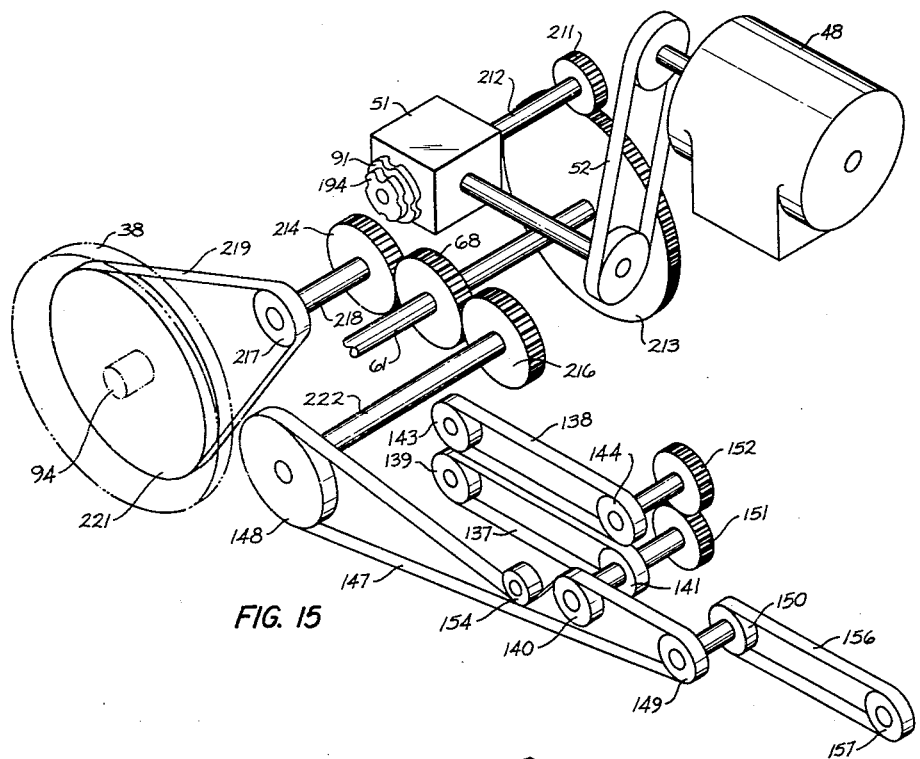
FIG. 15 is a diagrammatical view showing a gear and belt system for driving the various elements of the apparatus.

A motor 48 is positioned atop a support 49 which is mounted on the table 28, wherein the motor 48 is mechanically coupled to a gearing mechanism 51 by a belt 52. When switches 50 and 53 (FIG. 13) are closed, electrical energy from a D.C. supply 60 is supplied to the motor 48 to operate the motor, thereby driving the gearing mechanism 51 which distributes the driving force to the various driven elements of the apparatus as shown in FIG. 15 and discussed hereinafter.

Figure 2:
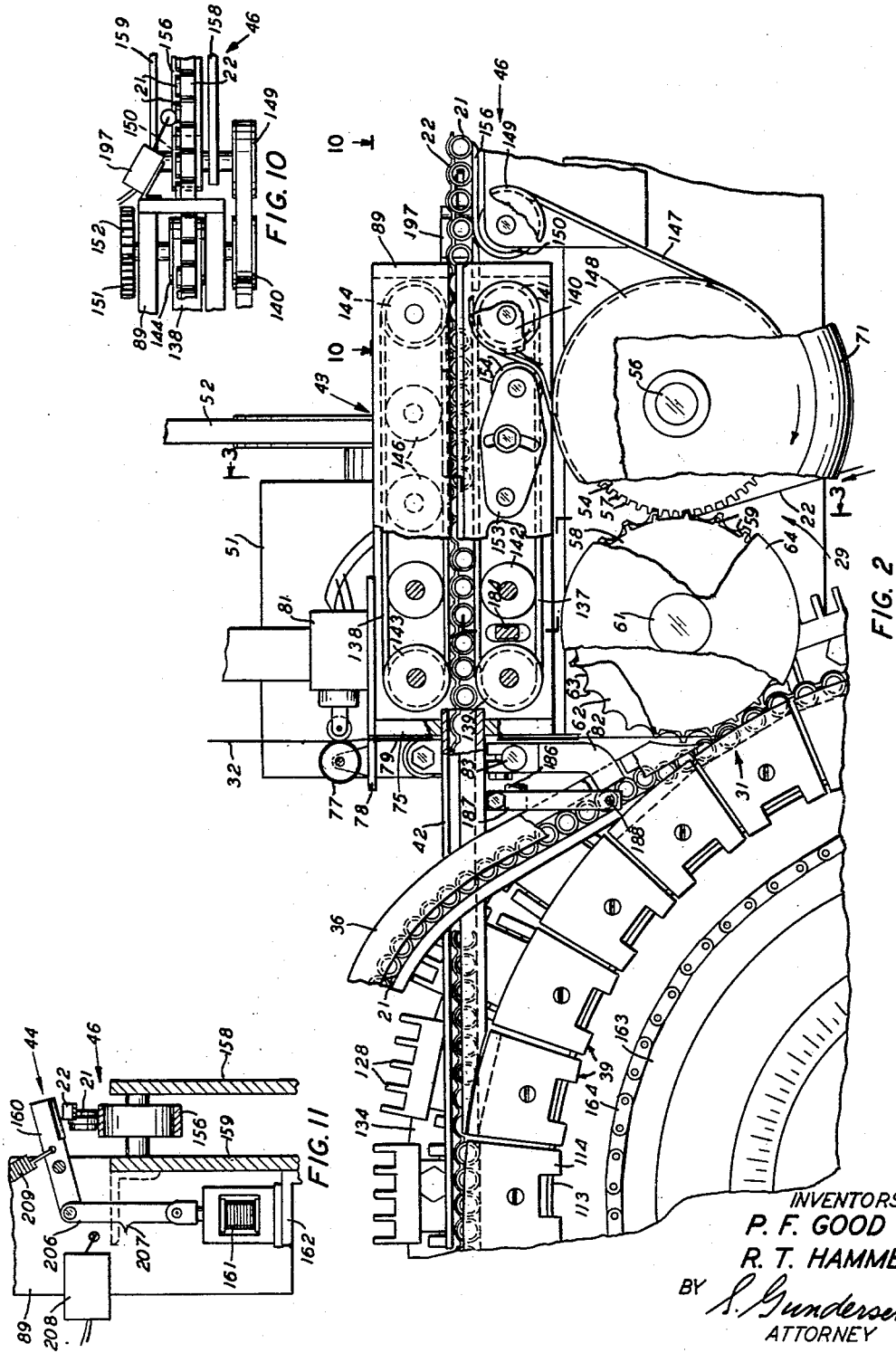
FIG. 2 is an enlarged, partial elevational view showing the assembling of a crimped strip with a strip of solder and a plurality of bushings and also conveyor means for removing a bonded assembly.
Figure 3:
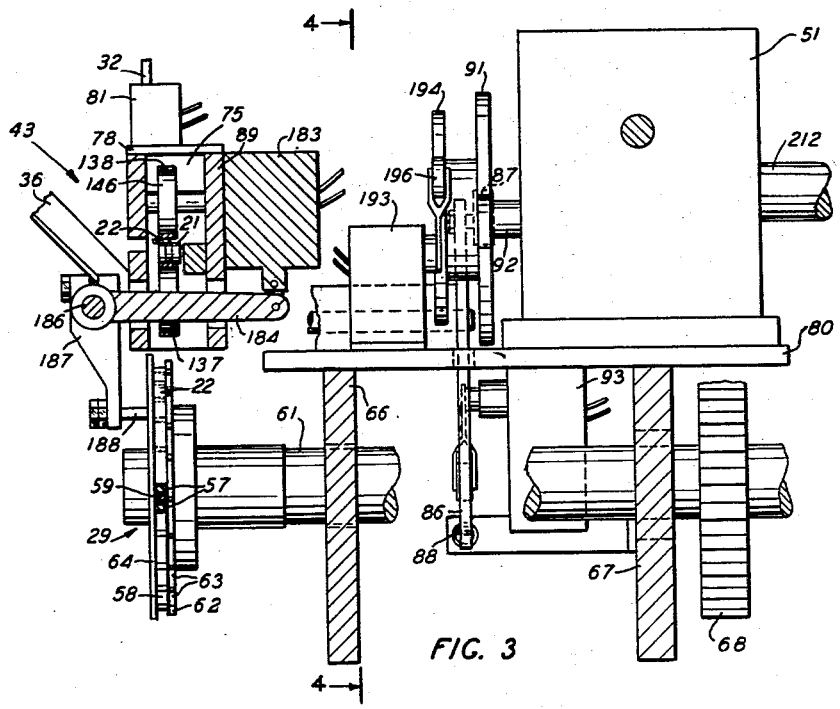
FIG. 3 is a sectional view taken on line 3—3 of FIG. 2 showing various camming and lever mechanisms for controlling the operation of the apparatus.
Figure 14:
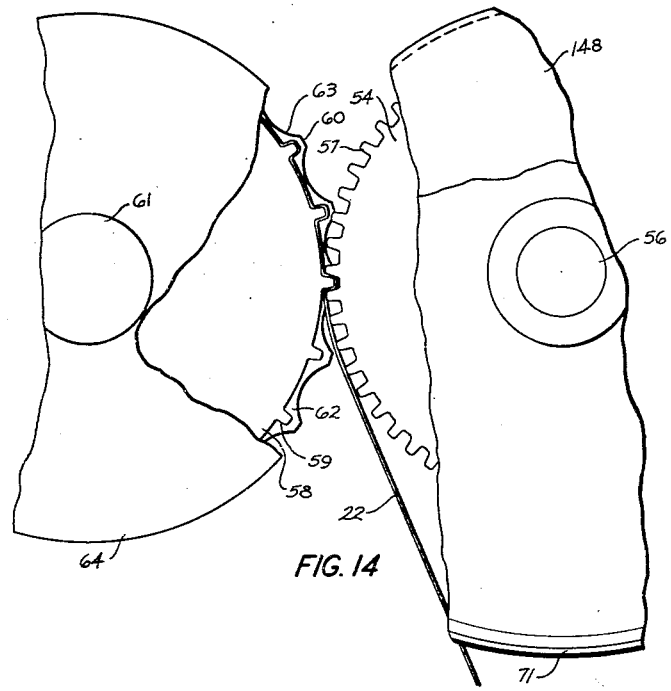
FIG. 14 is an enlarged, partial view showing gearing elements utilized in crimping the strip and for aligning the bushings between crimped portions of the strip for a subsequent bonding operation.

As shown in FIG. 2, the crimping station 29 is provided with a gear 54 mounted on a shaft 56 which is rotated through the gearing mechanism 51 to be described hereinafter, wherein the gear 54 is provided with a predetermined number of teeth 57 formed about the periphery thereof. As shown in FIGS. 2 and 3, the crimping station 29 is further provided with a rotary assembly consisting of a gear 58 having a predetermined number of teeth 59 formed about the periphery thereof, wherein the number of teeth 59 formed on the gear 58 are less than the number of teeth 57 formed on the gear 54. The gear 58 is mounted on a shaft 61 also rotated through the gearing mechanism 51 to be described hereinafter. A disc 62 is provided with a scalloped periphery 63 and is positioned adjacent to the rearward surface of the gear 58 (FIGS. 2, 3 and 14) and is mounted on the shaft 61 for rotation therewith. A second disc 64 is positioned adjacent to the forward surface of gear 58 (FIGS. 2, 3 and 14) and is also mounted on the shaft 61, wherein the shaft 61 is mounted for rotation in a pair of cross supports 66 and 67 (FIG. 3) which form a portion of the table 28 (FIG. 1). A gear 68 (FIGS. 3 and 15), which is mounted on the shaft 61, is coupled to the gearing mechanism 51 as described hereinafter thereby providing rotational movement for the shaft 61 and, hence, the discs 62 and 64 and the gear 58. Referring to FIG. 14, it is noted that the teeth 59 of the gear 58 coincide with peaks 60 of the scalloped periphery 63 formed in the disc 62.

It is further noted, as shown in FIG. 2, that the teeth 57 of the gear 54 are positioned to mesh with the teeth 59 of the gear 58 in such a manner that the strip 22 passing therebetween is periodically crimped in accordance with the spacing between the teeth 59.

Referring to FIG. 2, as the shafts 56 and 61 are rotated, the copper strip 22 is fed between the sets of teeth 57 and 59 of the gears 54 and 58, respectively, thereby providing a crimping action upon the strip 22 to form the crimped sections such as crimped section 23 (FIG. 12). A manually controllable handwheel 71 is mounted on the free end of the shaft 56 to provide manual control for the conveyor units 43 and 46 during a period when the motor 48 is not operating. It is to be noted that, as shown in FIG. 1, an arm 72 is pivotally mounted at one end thereof to the support plate 27 and is provided with a roller 73 for engaging the copper strip 22. A tension spring 74 is fastened at one end thereof to an intermediate point on the arm 72 and is fastened at the opposite end thereof to the support plate 27 thereby providing a tensioning force on the copper strip 22 as the strip is withdrawn from the supply reel 26. A switch 76 (FIGS. 1 and 13) engages the copper strip 22 thereby closing the switch 76 which is in series with the drive motor 48. In the event the supply of copper strip 22 should be depleted, the switch 76 is thereby opened to render the motor 48 inoperable to stop the operation of the apparatus.

As shown in FIGS. 1 and 2, the solder strip 32 is fed into tangential engagement with a sheave 77 which is mounted on a support 78 adjacent to the conveyor 43. The strip 32 is further fed through a tube 79 and into the assembly station 31. A switch 81 (FIGS. 1, 2 and 13), which is in series with the drive motor 48 (FIGS. 1 and 13), is positioned adjacent to the sheave 77 on the support 78 and engages the solder strip 32. In the event the supply of solder 32 is depleted, the switch 81 is opened thereby rendering the motor 48 (FIGS. 1 and 13) inoperable to prevent further operation of the apparatus. It is noted that the outfeed trough 42 extends into a housing 89 which supports the conveyor 43 as represented by the partially broken away end plate 75 to expose the manner in which the outfeed trough exits into the housing. In addition, the tube 79 extends downwardly from the support 78 in front of the outfeed trough 42, as viewed in FIG. 1, but is broken away along the break-away lines of end plate 75, thereby indicating that the tube is in front of the outfeed trough and to the left of the end plate 75. In this manner, the solder strip 32 is fed into the assembly station 31 to provide solder for the subsequent assembly and bonding operation.

Figure 4:
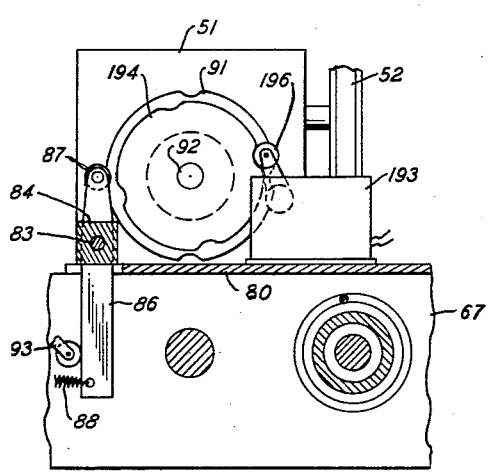
FIG. 4 is a sectional view taken on line 4—4 of FIG. 3 disclosing a camming principle which controls a bushing feed device and a pattern-checking device.

As shown in FIGS. 1 and 2, the bushings 21 are fed through the chute 36 into the assembly station 31. An arm 82 is curved at the free end thereof to engage the bushings 21 as the bushings are fed to the assembly station 31. The opposite extremity of the arm 82 is mounted about one end of a shaft 83. Referring to FIG. 4, the shaft 83 is rotatably positioned within a support block 84, which is mounted on a support 80 and is further positioned within an aperture formed in an intermediate portion of an arm 86. A cam follower 87 is mounted in one end of the arm 86 and a tension spring 88 is fastened at one end thereof to the opposite extremity of the arm 86. The opposite extremity of the spring 88 is fastened to a switch 93 (FIG. 3). The cam follower 87 engages a cam 91 (FIG. 4), which is mounted on a shaft 92. The shaft 92 is drivingly coupled to the gearing mechanism 51 as shown in FIG. 15. The switch 93 (FIG. 13), which is in series wtih the drive motor 48 (FIG. 13), engages a lower portion of the arm 86, as shown in FIGS. 3 and 4. Referring further to FIG. 4, as the cam 91 is rotated, the arm 86 is pivoted about the shaft 83 due to the action of the spring 88. The rotation of the shaft 83 is coupled to the arm 82 which engages the bushings 21 (FIGS. 1 and 2). Due to the presence of the bushings 21, the curved portion of the arm 82 is prevented from moving into the chute 36 (FIGS. 1 and 2) thereby hindering the rotation of the shaft 83. As the cam follower 87 approaches the depressions formed in the cam 91, the arm 86 is prevented from pivoting completely so that the cam follower 87 does not completely engage the depressions of the cam 91; therefore, the switch 93 is retained in a closed position. In the event the supply of bushings 21 in the chute 36 should be depleted, the curved portion of the arm 82 will then pivot into the chute 36, as the cam follower 87 engages a depression on the cam 91, thereby allowing full pivotal movement of the arm 86. In this manner, the switch 93 will be opened to render the motor 48 inoperable thereby preventing further operation of the apparatus.

Figure 5:
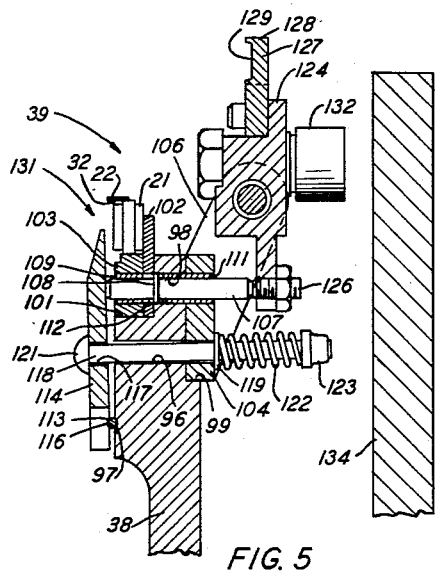
FIG. 5 is a sectional view taken on line 5—5 of FIG. 1 disclosing a clamping mechanism for clamping the bushing to the strip with the solder held therebetween.
Figure 6:
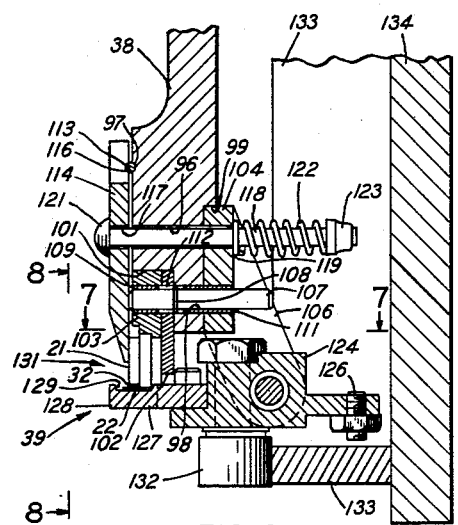
FIG. 6 is a sectional view taken on line 6—6 of FIG. 1 showing the clamping mechanism in an operational position.

As shown in FIGS. 5 and 6, the wheel 38, which is mounted on a shaft 94 (FIGS. 1 and 15) and driven for rotation by the gearing mechanism 51 (FIG. 15), is provided with a series of radially arranged apertures 96 for supporting the clamping members 39. In addition, the wheel 38 is formed with a groove 97 which extends circumferentially about the central axis of the wheel on one face thereof. The wheel 38 is further provided with a second series of radially spaced apertures 98 (one shown) and with cutaway portions 99 and 101 formed on opposite faces of the wheel adjacent to the periphery thereof. Each clamping member 39 is provided with a support 102 and a retaining member 103, each provided with apertures, which are positioned in the cutaway 101 so that the apertures thereof are coaxially aligned with the apertures 98 of the wheel 38. Further, a plate 104, which is provided with a bifurcated support arm 106 extending therefrom and having a pair of apertures therein, is positioned in the cutaway portion 99 so that the apertures thereof are aligned with the apertures 96 and 98 of the wheel 38. A pin 107 is provided with an annular rib 108 and is slidably positioned within the apertures which are aligned with the aperture 98 of the wheel 38. A pair of spacers 109 and 111 are positioned within the apertures aligned with the aperture 98 so that a chamber 112 is formed thereby to provide an area of slidable movement for the annular rib 108. A rod 113 is positioned in the groove 97 of the wheel 38. A plate 114, having a groove 116 formed in one face thereof and an aperture 117 formed therein, is positioned adjacent to the wheel 38 so that the groove 116 engages the rod 113 and the aperture 117 substantially coincides with the aperture 96 of the wheel 38. A stud 118 is provided with a spacer 119 and is positioned within the apertures which are aligned with the aperture 96 of the wheel 38 and through the aperture 117 of the plate 114. A head 121 is provided at the plate end of the stud 118 and a compression spring 122 is coaxially positioned about the opposite end of the stud 118. A fastening member 123 is positioned about the spring end of the stud 118 thereby retaining the plate 114 in a resilient relation adjacent to the wheel 38. A block 124, which is pivotally mounted at the free end of the arm 106, is provided with a stop pin 126 at one extremity thereof and has mounted at the opposite extremity thereof a plate 127, which is provided with a plurality of fingers 128 (FIGS. 7 and 8).

Figure 7:
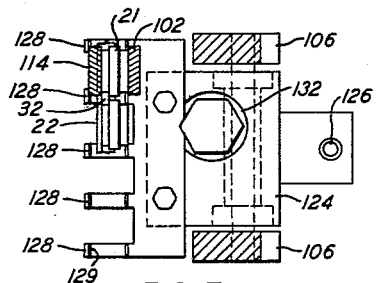
FIG. 7 is a sectional view taken on line 7—7 of FIG. 6 showing a portion of the clamping mechanism wherein a series of channels are utilized to hold the clamped strip in engagement with the solder and the bushings.
Figure 8:
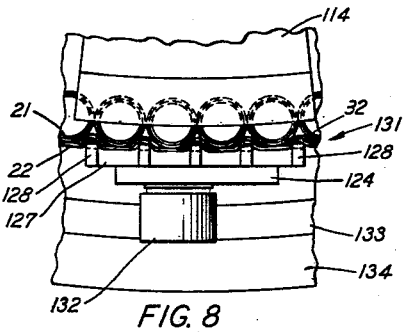
FIG. 8 is a sectional view taken on line 8—8 of FIG. 6 showing the relative relationship between the elements of the clamping mechanism and the assembled unit.

As shown in detail in FIGS. 7 and 8, each of the fingers 128 is provided with a corresponding cutaway 129. As shown in FIG. 5, one of the clamping members 39 is in a nonoperable position, wherein the pin 126 engages the pin 107 thereby urging the pin 107 into engagement with the free end of the plate 114. In this manner, the plate 114 pivots substantially about the rod 113 against the action of the spring 122 thereby providing a nest, generally designated by the reference numeral 131, for receiving the bushing 21, the solder 32 and the copper strip 22. It is to be noted that the nest 131 is formed by the free end of the plate 114, the outer periphery of the spacer 103 and a side of the support 102. It is further noted that the nest 131 continuously extends around the periphery of the wheel 38 adjacent the clamping members 39. As shown in FIGS. 1 and 6, a cam follower 132 is mounted on one face of the block 124 (FIG. 6) and rotates with the wheel 38 to engage a cam track 133. The cam track 133 is mounted on a circular plate 134 (FIGS. 1 and 6) which is fixedly disposed about the shaft 94 (FIG. 1). Referring further to FIG. 6, as the cam follower 132 engages the cam track 133, the block 124 is pivoted within the bifurcated arm 106 to position the fingers 128, and, hence, the cutaway portion 129 into contact with depressions formed in the copper strip 22 between the bushings 21.

As shown in detail in FIG. 6 and partially in FIG. 8, it is to be noted that as the block 124 is pivoted so that the fingers 128 engage the strip 22, the pin 126 is removed from engagement with the pin 107 where, due to the action of the spring 122, the plate 114 pivots into engagement with the bushing 21 which has been positioned in the nest 131.

Figure 9:
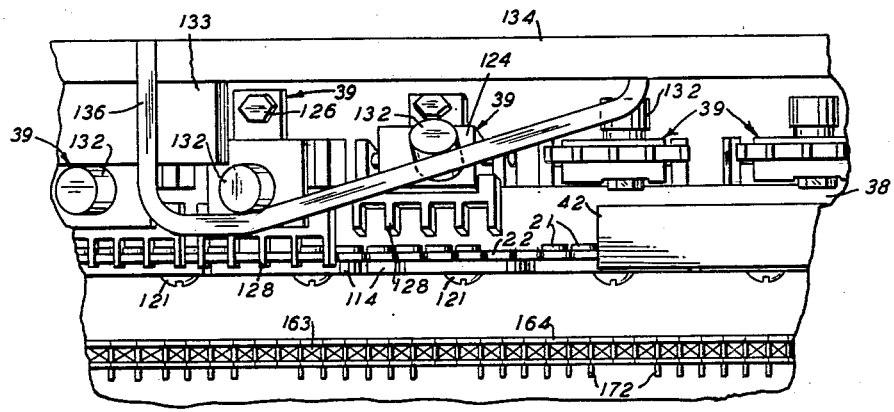
FIG. 9 is a sectional view taken on line 9—9 of FIG. 1 showing camming means for controlling the operation of the clamping mechanism and also revealing a chain having projections thereon for setting the pattern of the assembled units.

Referring to FIG. 1, as the clamped assembly is rotated by the wheel 38, the assembly passes adjacent to the induction coil 41, wherein a high frequency current (not shown) is supplied to the induction coil 41 to heat the area adjacent to the coil. In this manner, the strip of solder 32 which is clamped between the bushings 21 and the crimped copper strip 22 is melted. As the assembly passes from the heated area, the molten solder cools and solidifies thereby bonding the bushing 21 to the crimped strip 22. Referring to FIG. 9, as the wheel 38 continues to rotate with the bonded, assembled unit, the cam follower 132 of the clamping mechanism 39 engages a cam track 136, which is mounted on the circular plate 134. As the cam 132 engages the cam track 136, the block 124 is pivoted so that the fingers 128 disengage the strip 22 and are further pivoted to a resting position, as shown in FIGS. 5 and 9. The bonded unit is then fed from the wheel 38 into the outfeed trough 42. Referring specifically to FIG. 2 and generally to FIG. 1, the bonded unit is fed from the outfeed trough 42 into the unloading conveyor 43, which consists of a pair of opposed endless conveyor belts 137 and 138 for receiving the bonded unit. The unloading conveyor 43 is enclosed within the housing 89 and consists of the endless conveyor belt 137, which is formed around a pair of end sheaves 139 and 141 and a plurality of intermediate sheaves 142 (only one shown). The upper conveyor belt 138 is provided with a corresponding pair of end sheaves 143 and 144 and a plurality of intermediate sheaves 146. A belt 147 is positioned about a sheave 140, a wheel 148 and an end sheave 149 on the conveyor 46. As shown in FIGS. 10 and 15, the upper conveyor belt 138 is connected to a gear arrangement consisting of gears 151 and 152 thereby providing a mechanical coupling between the lower conveyor belt 137 (FIGS. 2 and 15) and the upper conveyor belt 138. In this manner, as the shaft 56 is rotated through the gearing mechanism 51, a driving force is supplied to the conveyors 46, and the conveyor belts 137 and 138. It is to be noted that an arm 153 is pivotally mounted on the housing 89 and is provided with a roller 154 for tensioning the belt 147.

As shown in FIGS. 1 and 10, the conveyor 46 consists of an endless belt 156, a sheave 150 (FIG. 2) and an end sheave 157 (FIG. 1), which are positioned between a pair of support plates 158 and 159. Referring to FIG. 11, the bonded unit is fed from the unloading conveyor 43 (FIG. 1) adjacent the mechanism 44 wherein a cutter 160, which is pivotally mounted intermediate the ends thereof to the conveyor housing 89, is actuated by a solenoid 161, which is pivotally mounted to one end of the cutter 160, to engage the strip 22 at the point 23 (FIGS. 1 and 12), as previously described, thereby severing the strip from the trailing end to form a completed product 24. The solenoid 161 is mounted on a platform 162, which is attached to the support plate 159. As shown in FIG. 15, a gearing mechanism 51 is a central source for the driving force of the apparatus and is driven through the belt 52 by the motor 48. A gear 211 is connected to the free end of a shaft 212 and is rotated by the gearing mechanism 51 and drives a gear 213 which further drives the shaft 61 attached thereto. As previously noted and shown in FIG. 3, the gear 68 is attached to the shaft 61 and rotates therewith and further drives a pair of gears 214 and 216. The gear 214 is coupled to a sprocket 217 through a shaft 218. A drive chain 219 is positioned about the sprocket 217 and is further positioned about a larger sprocket 221 which is secured to the shaft 94 for providing a rotating force for the wheel 38. The gear 216 is coupled to the wheel 148 through a shaft 222 and provides rotational force for the wheel. Hence, as the wheel 148 is rotated, the belt 147 transmits a driving force for the conveyor belts 137 and 138 and 156 as previously described.

*Pattern Setting and Checking Mechanisms*

As shown in FIG. 1, a sprocket wheel 163 is positioned coaxially about the shaft 94 and mounted for rotation thereon. A chain 164 is positioned about the sprocket wheel 163 and is further positioned about a second sprocket wheel 166, which is mounted on one end of an arm 167, pivotally mounted to the tab 28 intermediate the ends thereof. The opposite extremity of the arm 167 is connected to a tension spring 168, which is further connected at the opposite end thereof to the table 28. A third sprocket wheel 169 is positioned in a fixed mounting 171, which is attached to the circular plate 134 and engages the chain 164.

As shown in FIG. 9, the sprockets of the chain 164 are provided with a plurality of pins 172, which project therefrom and are arranged in patterns, which correspond with the desired arrangement of the bushings 21 on the strip 22. As the chain 164 is rotated by the action of the sprocket wheel 163, the pins 172 engage a series of switches 173, 174 and 176 (FIGS. 1 and 13), which are positioned adjacent to the wheel 38 in the path of travel of the pins 172.

Figure 13:
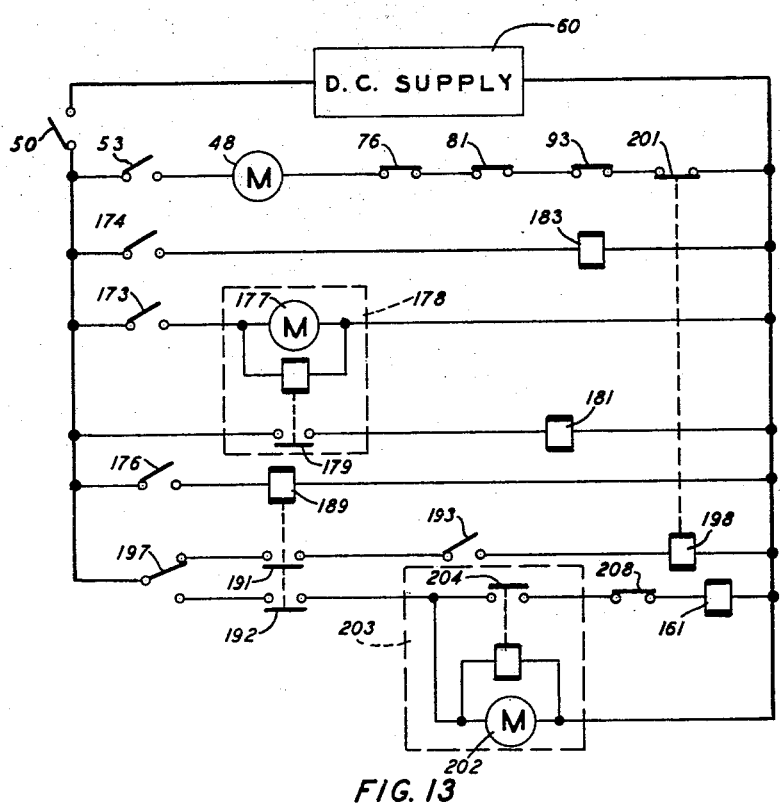
FIG. 13 is an electrical schematic showing the electrical control for the apparatus.

Referring to FIG. 13, when the switch 173 is actuated by disengagement with the last pin 172 of the pattern of pins projecting from the chain 164 (FIGS. 1 and 9), a motor 177 of a timer 178 is actuated to close a contact 179 of the timer for a predetermined period of time. As the contact 179 is closed, a solenoid 181 is actuated to supply cooling water to a nozzle 182 (FIG. 1) which is positioned adjacent to the lowermost portion of the wheel 38 and adjacent to the assembled bushings 21 and the strip 22 and is mounted on the circular plate 134. As determined by the timer 178, the cooling water is sprayed upon that portion of the strip 22 which does not have any bushings 21 bonded thereto. In this manner, damage to the copper strip 22 due to overheating is prevented.

As the pins 172 (FIGS. 1 and 9) engage the switch 174, the switch is opened. When the pins 172 have passed the switch 174 and there is an absence of pins adjacent to the switch 174, the switch is actuated to energize a solenoid 183 (FIG. 3), which is mounted on the housing 89 of the conveyor 43, as shown in FIG. 3. The solenoid 183 is connected to an arm 184, which is pivoted about a shaft 186. A second arm 187 (FIGS. 2 and 3) is pivotally mounted to the shaft 186 and is provided with a pin 188 at the opposite extremity thereof. As the solenoid 183 is actuated, the arm 184, and hence the arm 187, is pivoted such that the pin 188, as shown in FIGS. 2 and 3, is inserted into a bushing 21, which is being fed through the chute 36. In this manner, the bushings are prevented from being fed into engagement with the crimped copper strip 22 and the solder strip 32. Hence, it is easily seen that the number of bushings which are prevented from being fed into engagement with the copper strip 22 is determined by the pattern of pins 172 which are provided on the pattern-setting chain 164.

As shown in FIG. 13, the switch 176 (FIG. 1) is actuated by the pins 172 to energize a coil 189 thereby closing contacts 191 and 192. A switch 193 is in series with the contact 191 and is positioned on the support 80, as shown in FIGS. 3 and 4. A cam 194, mounted on the shaft 92, is provided with a series of depressions for engaging a cam follower 196 to periodically actuate the switch 193.

A single-pole, double throw switch 197 (FIG. 10) is connected in the circuit, as shown in FIG. 13, and is physically mounted on the support plate 158 and engages the bushings 21 as they pass adjacent thereto on the conveyor 46. As the switch 197 engages the bushings, the switch is actuated in such a manner that it is placed in series with the contact 191, the switch 193 and a coil 198. By adjusting an arm 199, as shown in FIG. 1, which is rotatably mounted about the shaft 94, the switch 176 is physically positioned to provide an accurate pattern check. In the event one or more bushings 21 are bonded to the strip 22 in a pattern which does not correspond with the pattern as set by the pins 172 on the pattern-setting chain 164, the switches 197 and 193 and the contact 191 will be closed simultaneously to energize the coil 198, thereby opening a normally closed contact 201 so that the power to the motor 48 is removed and, hence, the apparatus is prevented from further operation.

Referring to FIG. 11, as the bushings 21 pass the switch 197 (FIG. 10), the switch completes a circuit to a motor 202 (FIG. 13) of a timer 203 wherein, after a predetermined time, a contact 204 is closed to energize the solenoid 161 and thereby operate the cutter 160 to sever the strip 22 at the crimped section 23 (FIG. 12) as previously described. A link 206 is connected at one extremity to the solenoid 161, extends therefrom and is connected at the opposite extremity thereof to one end of the cutter 160. The link 206 is formed with a cam 207 which is positioned to actuate a switch 208. As shown in FIG. 13, the switch 208 is in series with the solenoid 161. In addition, a tension spring 209 is connected at one end thereof to the cutter 160 and is fastened at the opposite extremity thereof to the housing 89. Hence, as the solenoid 161 is actuated to pivot the cutter 160 towards the strip 22, the cam 207 engages and actuates the switch 208 to open the control circuit for the solenoid 161. Due to the inertia of the blade 160, the blade will continue towards the strip 22 and thereafter engage and sever the strip 22 at point 23 (FIG. 12), as previously described. Due to the action of the spring 209 and of the retraction of the link 206 and the solenoid 161, the cutter 160 is instantaneously retracted as the strip 22 is severed. Hence, the instantaneous action provided by this arrangement eliminates the necessity of stopping the feeding of the strip 22 in order to perform the severing operation.

Therefore, the pattern-setting chain 164, as shown in FIG. 1, is utilized to control the machine by determining the number of bushings 21 bonded to a predetermined length of the strip 22 and, further, controls the machine to provide the number of spaces which will exist on the strip 22 before another series of bushings 21 are bonded thereto. It is to be noted that a variety of pattern-setting chains 164 can be provided for determining various patterns in which different numbers of bushings 21 are bonded to predetermined lengths of the strip 22. To facilitate the insertion of the pattern-setting chain 164 into the apparatus, as described, the arm 167 is pivoted against the biasing of spring 168 so that the sprocket wheel 166 is urged towards the wheel 38. In this manner, the chain 164 can be inserted about the sprocket wheels 163 and 166 and over the sprocket wheel 169. Upon the releasing of the arm 167, the biasing action of the spring 168 provides a force, which returns the arm 167 to an operating position, wherein the pattern-setting chain 164 is held taut for future operation.

It is to be understood that the above-described arrangements are illustrative of the principles of the invention. Numerous other arrangements may be devised by those skilled in the art without departing from the spirit and scope of the invention.

What is claimed is:

1. Apparatus for assembling a plurality of articles to a corrugated, metal strip comprising a conveyor, a driver for the conveyor, means for feeding the articles onto the conveyor in groups having a predetermined number of articles therein, means for discontinuing the feeding of the articles at predetermined periods so that a spacing is provided between adjacent groups, and means for feeding the strip so that the corrugations engage the articles in a mating relation on the conveyor to support the end articles of each group in a spaced relation with the end articles of adjacent groups.

2. Apparatus for assembling a plurality of articles to a metal strip comprising a carriage, means for moving the carriage, a nest on the carriage for receiving the articles therein, a first clamping member resiliently mounted on the carriage adjacent to the nest for engaging and holding the articles in the nest, a second clamping member pivotally mounted on the carriage adjacent to the nest for engaging and holding the strip in engagement with the articles, means on the second clamping member for urging the first clamping member from the nest in a nonengaging position when the second clamping member is in a nonengaging position, means for periodically feeding groups of articles into the nest, means for continuously feeding the strip adjacent the moving carriage for movement therewith and into engagement with the articles as the articles are positoned in the nest, and means responsive to movement of the carriage for pivoting the second clamping member into engaging position to clamp the strip to the articles thereby releasing the first clamping member to clamp the articles in the nest.

3. Apparatus for assembling a plurality of articles to a metal strip comprising a carriage, a nest formed in the carriage for receiving the articles, a plurality of clamping members mounted on the carriage adjacent to the nest, means for moving the carriage, means for selectively and periodically feeding groups of a predetermined number of articles into the nest on the carriage, means for continuously feeding the strip adjacent the moving carriage for movement therewith and into engagement with exposed portions of the articles as the articles are positioned in the nest, and means for actuating the clamping members so that the groups of articles and the strip are held within the nest.

4. Apparatus for assembling a plurality of cylindrical articles to a metal strip comprising a carriage, means for moving the carriage, a nest in the carriage for receiving the cylindrical articles including a movable wall pivotally mounted and resiliently secured to the carriage, means for normally urging the movable wall from the nest, means for selectively and periodically feeding groups of a predetermined number of articles in side-by-side relation into the nest on the carriage, means for continuously feeding the strip adjacent the moving carriage for movement therewith and into engagement with the exposed portions of the articles as the articles are positioned in the nest, means responsive to movement of the carriage for clamping the strip to the articles within the nest, and means responsive to the movement of the clamping means for removing the urging means from engagement with the movable wall so that the wall resiliently engages the articles in the nest to hold them in a desired lateral disposition within the nest.

5. Apparatus for assembling a plurality of articles to a metal strip comprising a conveyor, a driver for the conveyor, a chain having pins projecting therefrom in a predetermined pattern, means for moving the chain in synchronism with the conveyor, means responsive to the movement of the pins projecting from the chain for feeding the articles onto the conveyor in groups having a predetermined number of articles therein and for discontinuing the feeding of the articles at predetermined periods so that a spacing is provided between adjacent groups, and means for continuously feeding the strip adjacent the driven conveyor for movement therewith and into mating relation with the articles as the articles are fed onto the conveyor.

6. Apparaus for assembling and securing a plurality of articles to a metal strip comprising a conveyor, a driver for the conveyor, a chain having pins projecting therefrom in a predetermined pattern, means for moving the chain is synchronism with the conveyor, means responsive to the movement of the pins projecting from the chain for feeding the articles onto the conveyor in groups having a predetermined number of articles therein and for discontinuing the feeding of the articles at predetermined periods so that a spacing is provided between adjacent groups, means for continuously feeding the strip adjacent the conveyor for movement therewith and into mating relation with the articles as the articles are fed onto the conveyor, and means for bonding the assembled articles on the conveyor to the strip.

7. Apparatus for assembling and securing a plurality of articles to a metal strip comprising a conveyor, a driver for the conveyor, a chain having pins projecting therefrom in a predetermined pattern, means for moving the chain in synchronism with the conveyor, means responsive to the movement of the pins projecting from the chain for feeding the articles onto the conveyor in groups having a predetermined number of articles therein and for discontinuing the feeding of the articles at predetermined periods so that a spacing is provided between adjacent groups, means for continuously feeding the strip adjacent the conveyor for movement therewith and into mating relation with the articles as the articles are fed onto the conveyor, means for bonding the assembled articles on the conveyor to the strip, a cutting mechanism, and means responsive to the pattern of the groups of articles bonded to the strip for actuating the cutting mechanism to sever the strip at a point between adjacent groups so that predetermined lengths of the strip having a predetermined number of articles bonded thereto are formed thereby.

References Cited in the file of this patent
UNITED STATES PATENTS

| | | |
|---|---|---|
| 1,710,393 | Williams | Apr. 23, 1929 |
| 2,280,573 | Flaws | Apr. 21, 1942 |
| 2,404,782 | Berggren | July 30, 1946 |
| 2,731,131 | Shannon | Jan. 17, 1956 |
| 2,777,189 | Evelyn | Jan. 15, 1957 |

FOREIGN PATENTS

| | | |
|---|---|---|
| 299,552 | Switzerland | June 15, 1954 |